US 6,326,590 B1

(12) United States Patent
Shaffer et al.

(10) Patent No.: US 6,326,590 B1
(45) Date of Patent: Dec. 4, 2001

(54) NOZZLE ELEMENT ADAPTABLE TO A LASER BEAM TUBE USED IN LASER EDGE MARKING EQUIPMENT

(75) Inventors: Wayne K. Shaffer, Penfield; David C. Press, Webster, both of NY (US); Gregory A. Smith, Fort Collins, CO (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/490,914

(22) Filed: Jan. 25, 2000

(51) Int. Cl.[7] .................................................... B23K 26/14
(52) U.S. Cl. ..................................................... 219/121.84
(58) Field of Search ....................... 219/121.67, 121.68, 219/121.84; 347/258, 224; 604/313; 372/55, 58, 59, 61

(56) References Cited

U.S. PATENT DOCUMENTS 3,866,398 * 2/1975 Vernon, Jr. et al. .................. 134/1.3
4,027,137 * 5/1977 Liedtke ............................... 219/121.7
4,162,390 * 7/1979 Kelly ................................. 219/121.63
4,303,824 * 12/1981 Morgan et al. .................. 219/121.84
4,315,133 * 2/1982 Morgan et al. .................. 219/121.84
4,554,560   11/1985 Kanaoka et al. .
4,652,722    3/1987 Stone et al. .
5,609,780    3/1997 Freedenberg et al. .
5,940,115 * 8/1999 Nakamura et al. ................... 347/251
6,191,382    2/2001 Damikolas .

FOREIGN PATENT DOCUMENTS 198 00 783 A   7/1999 (DE) .
0 519 391 A   11/1985 (EP) .

* cited by examiner

Primary Examiner—Samuel M. Heinrich
(74) Attorney, Agent, or Firm—Clyde E. Bailey, Sr.

(57) ABSTRACT

A nozzle element for laser marking indicia on a moving photosensitive web substantially reduces fog spots on the web caused by impinging laser energy. The nozzle element is configured to conform to the outlet end of the laser beam tube to eject particulates through vacuum outlet port.

5 Claims, 3 Drawing Sheets

NOZZLE ELEMENT ADAPTABLE TO A LASER BEAM TUBE USED IN LASER EDGE MARKING EQUIPMENT

FIELD OF THE INVENTION

The invention relates generally to the field of laser marking systems. More particularly, the invention concerns an apparatus and a method that uses laser energy for marking indicia on photosensitive web with a dramatic reduction in the occurrence of fog on the photosensitive web.

BACKGROUND OF THE INVENTION

Conventional edge marking in photographic film manufacturing involves printing some sort of identification indicia along the edge of film rolls during the finishing operation. Edge marked film has direct verification of roll identity, sheet identity and waste identity during all stages of the manufacturing process. Importantly, edge marked film provides accurate footage identification that enables operators to quickly identify, trace and remove film imperfections, thereby minimizing the amount of product waste. More generally, edge marked film increases process understanding by allowing process interactions to be more closely identified with their corresponding effect on the product. Traditional embossing marking techniques are being replaced by laser edge marking. Current mechanical embossing techniques (embossing wheels) are not programmable, generate poor quality marks and require excessive maintenance. Laser edge marking, on the other hand, is particularly advantageous in the industry because it provides a permanent record and can be read before and after film processing.

Advances in laser technology enabled the use of a dot matrix $CO_2$ laser marking system to be used to replace existing embossing technology. Off the shelf laser marking equipment will mark the film at required throughput rate, however, an unacceptable level of fog spots occurred.

Thus, a particular shortcoming of these advanced high powered laser systems used for edge marking photosensitive film is that they produce a by-product that impinges on the film surface. Laser energy by-products in the form of a plume of energized smoke and irradiated debris on the film surface is known to cause the localized fogging on the film. Experience has shown that localized fogging is not easily eliminated even when the film is immersed in a 99.8% nitrogen atmosphere.

More recent developments in laser technology enabled the development of high speed marking systems using short pulse lasers. Short pulse laser exposure on photosensitive film shows some promise in reducing the occurrences of fog spots. Our experience also indicates that an air jet directed at the laser impingement point on the film surface further reduce the occurrence of fog. Statistical methods have been employed to gain information on fog incidence reduction when laser marking photosensitive film. It has been experimentally proven that laser pulse width does not have a significant effect on fog. Importantly, however, our experience does suggest that laser peak power has a dramatic effect on the reduction of occurrences of fog spots by a factor of about 30. In addition, significant statistical benefits can be derived from an air jet that we believe can further reduce the incidences of fog spots by a factor of about 10.

Hence, laser marking without controlling peak power will result in 14% to 50% of the laser-generated dots of dot matrix characters to have fog spots around the dots. There are no present attempts known to the inventors to control peak power in laser edge marking devices because embossing techniques still remain prevalent in the industry and, more importantly, the fog spots remain a significant quality issue during the finishing process.

Therefore, a need persists for variable information to be permanently marked on the edge of each sheet of photosensitive web, such as photographic film, without significant incidences of fog spots on the surface of the film.

SUMMARY OF THE INVENTION

It is, therefore, an object of the invention to provide a nozzle element for laser marking equipment used for marking indicia on a moving photosensitive web.

It is another object of the invention to provide a nozzle element adaptable to an apparatus for exposing a moving photosensitive web to laser energy while substantially reducing the occurrence of deleterious fog spots on the photosensitive web.

Yet another object of the invention is to provide a nozzle element adaptable to an apparatus for laser printing indicia on a photosensitive web by further directing a jet of air onto the laser energy impinged surface of the photosensitive web.

It is a feature of the invention that the apparatus for laser marking indicia on a moving photosensitive web has a nozzle element associated with the laser beam tube for reducing fog spots on the photosensitive web.

To accomplish these and other objects and features and advantages of the invention, there is provided, in one aspect of the invention, a nozzle element adaptable to a laser beam tube, comprises:

a chamber having a laser energy inlet end and a laser energy outlet end;

an air jet member arranged in said chamber for directing a burst of air onto said laser impingeable surface;

at least one lens arranged in said chamber for focusing each one of a plurality of laser beams passing through said chamber onto said laser impingeable surface;

a lens cleaning member arranged in said chamber proximate to said at least one lens; and a vacuum port extending from said chamber, said vacuum port providing means for evacuating said chamber of smoke and debris generated during laser marking.

It is, therefore, an advantageous effect of the present invention that laser edge markings on photosensitive web can be accomplished with the element of the invention that is easy to operate, simple and cost effective to produce and that substantially reduces the occurrence of fog spots on the photosensitive web.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
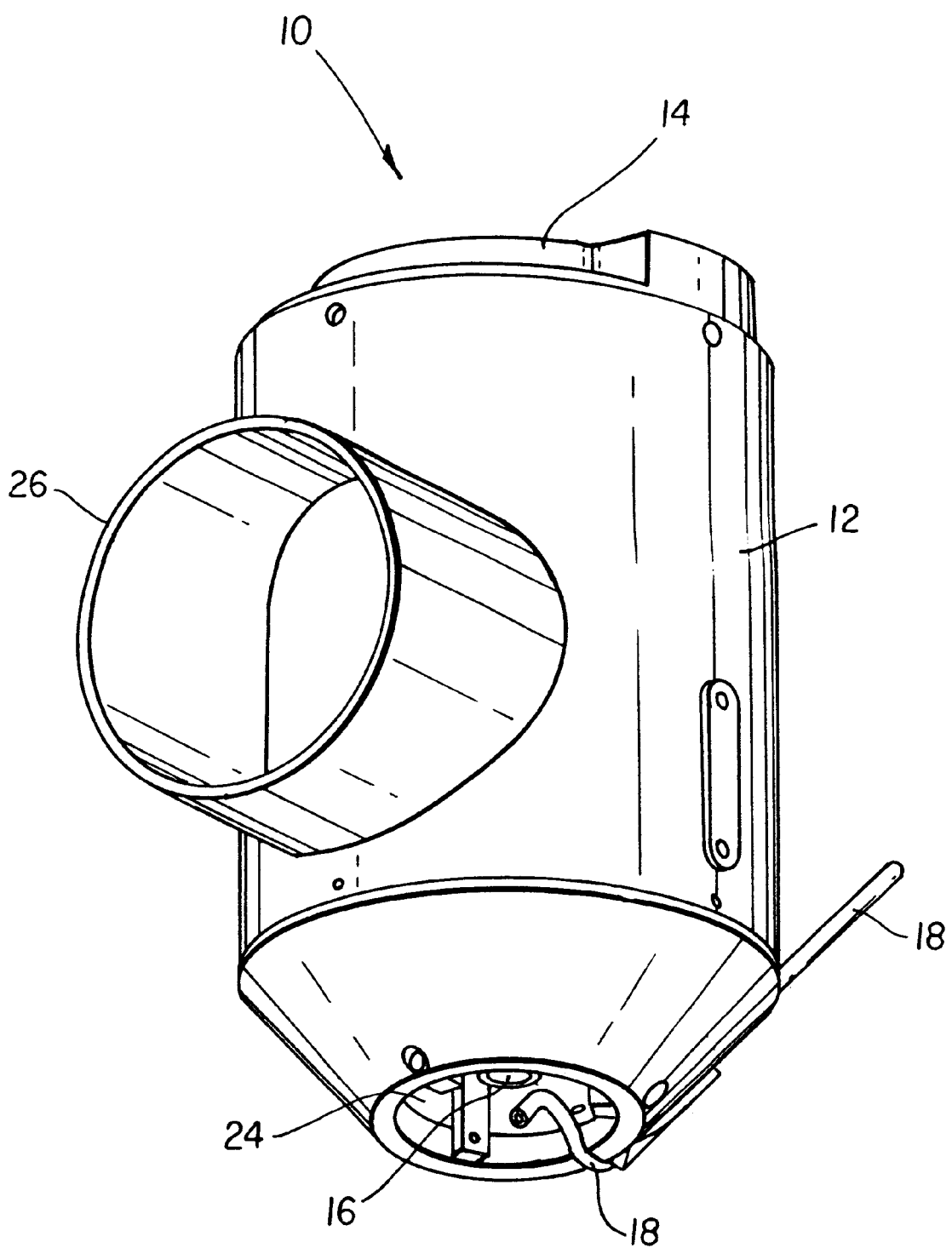
FIG. 1 is an isometric view of the nozzle element of the invention.
Figure 2:
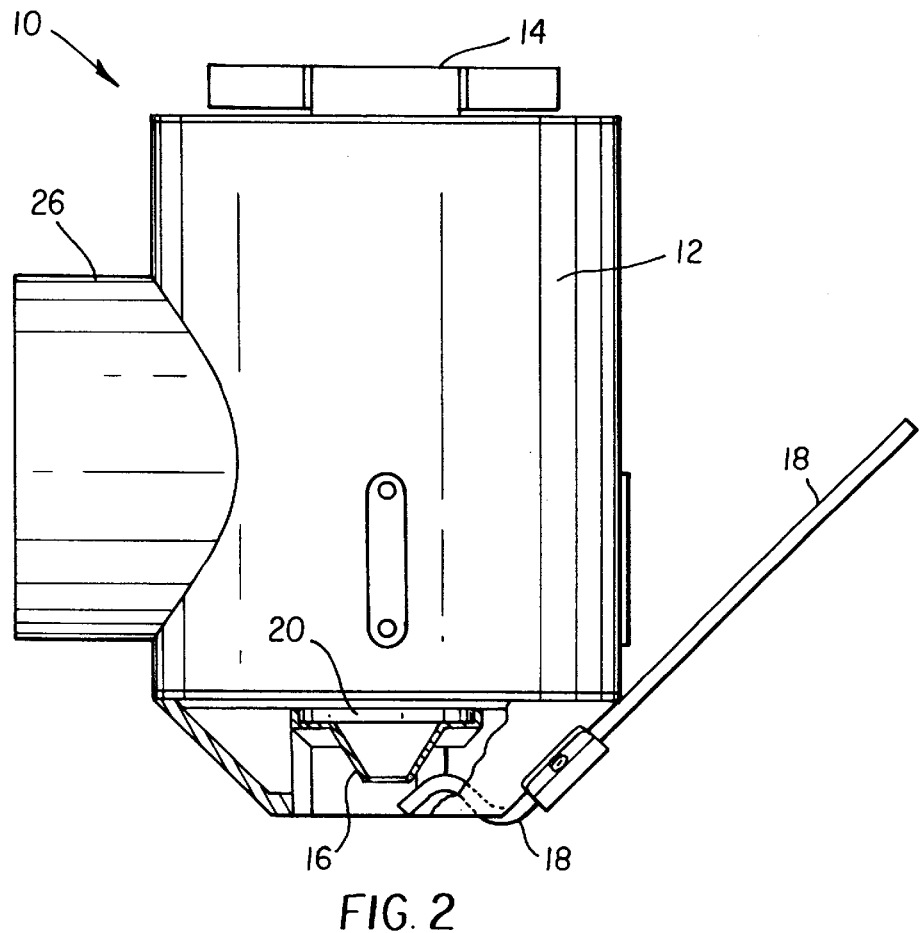
FIG. 2 is a partial cross-sectional view of the nozzle element showing the vacuum chamber and air jet member.
Figure 3:
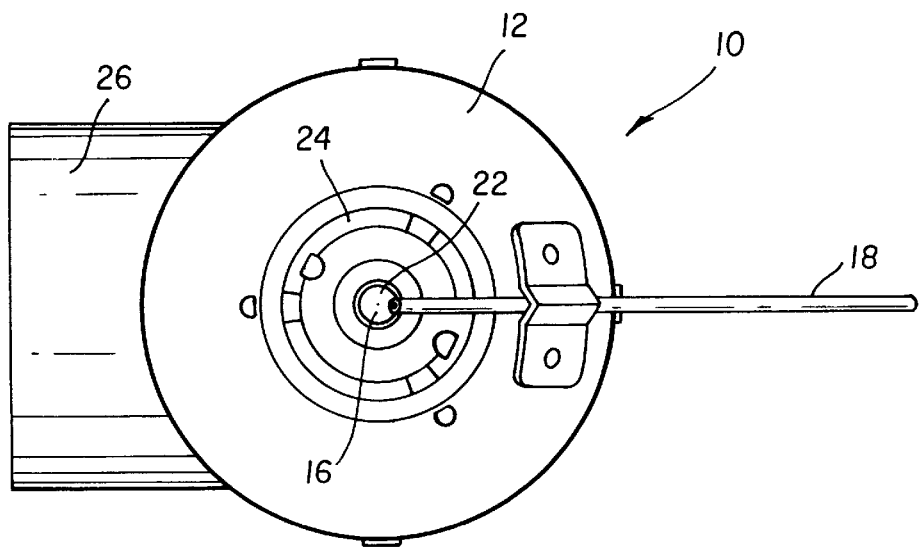
FIG. 3 is a bottom view of the nozzle element of FIG. 2.

Turning now to the drawings, and particularly to FIGS. 1–3, the nozzle element 10 according to the principles of the invention is illustrated. According to FIGS. 1 and 2, nozzle element 10 has a preferably generally cylindrical shaped chamber 12 with a laser energy inlet end 14 and a laser energy outlet end 16. Inlet end 14 is adaptable to any laser energy output device, such as a laser marking system for marking indicia on photosensitive web. Output end 16 is configured to focus beams of radiation onto a moving photosensitive web and to be spaced proximate to the moving photosensitive web.

Referring to FIGS. 1–3, an air jet member 18 is arranged in the chamber 12 near the outlet end 16. Air to air jet member 18 may be supplied by any general source (not shown). Air jet member 18 is configured for directing a burst of air onto a laser beam impingeable surface, such as a photosensitive web positioned proximate to the air jet member 18.

Referring to FIG. 2, chamber 12 has at least one lens 20 arranged therein for focusing each one of a plurality of laser beams passing through the chamber 12. Lens 20 is preferably a short focal length zinc selenide lens. Lens 20 may be mounted in any one of a variety of ways in chamber 12, for instance using a typical lens mount (not shown).

Figure 4:
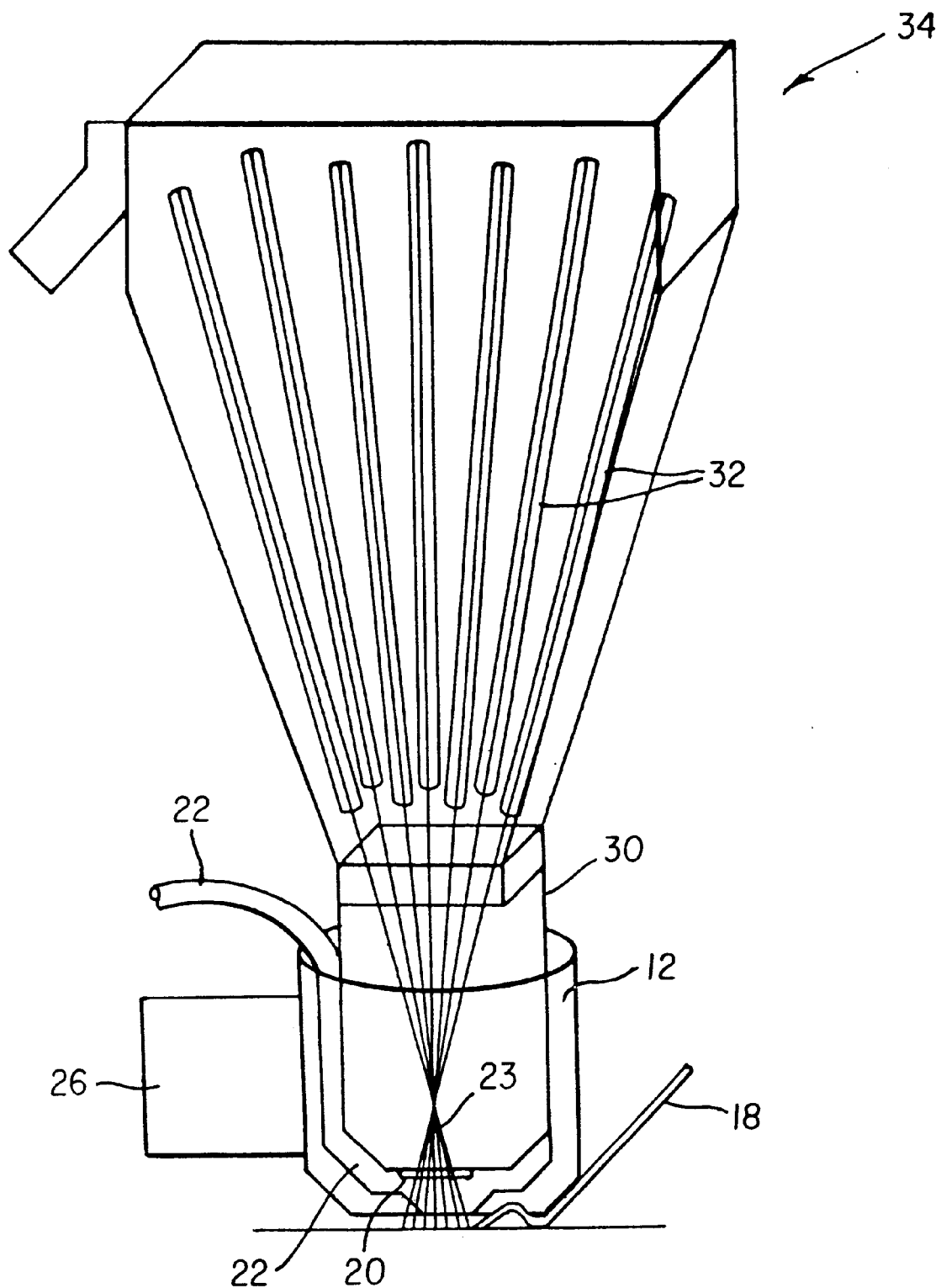
FIG. 4 is a front elevational view of the laser head showing an attenuating screen therein.

Referring to FIG. 4, a lens cleaning member 22 is arranged in the chamber 12 proximate the lens 20. Nozzle element 10 was developed to keep the lens 20 clean, prevent plume and draw away vapors associated with impinging laser energy. In the preferred embodiment, lens cleaning member 22 is a positive air flow pattern surrounding the lens 20 that shields the lens 20 from particulate matter. Alternatively, lens cleaning member 22 may be a burst of air directed at the lens 20 (not shown).

Turning now to FIGS. 1–3, chamber 12 further has a vacuum inlet port 24 and a vacuum outlet port 26 in fluid communication with the chamber 12. Vacuum outlet port 26 provides means for evacuating the chamber 12 of smoke and debris generated during laser marking. To concentrate vacuum at a predetermined location, inlet port 24 preferably has a generally conical shape for concentrating vacuum on a predetermined location. Affluence generated by the marking process without vacuum resulted in no detection of cyanide, sulfur dioxide, hydrochloric acid, or carbon monoxide. Carbon dioxide could be detected but the level was below exposure limits. Mercury, silver and aldehydes vapors were adequately removed by the Fumex FA2 fume extraction machine.

Vacuum outlet port 26 is connected to a source of vacuum (not shown), for receiving such particulates that are collected through vacuum inlet port 24. Laser beam tube 30 is preferably the output end of a laser marking system 34 (only partially shown).

Preferably, nozzle element 10 is made from any structurally rigid material such as any metallic material. We prefer using aluminum because it is light-weight and can be easily formed.

In operation, nozzle element 10 is adapted to a laser beam tube 30 of a laser marking system 34. Laser beams generated by a plurality of lasers 32 pass through the nozzle element 10 and are focused by lens 20 in a predetermined pattern onto a photosensitive web (not shown). Debris, such as plume of smoke, generated by the laser energy striking the photosensitive web is drawn away from the web and into and through the chamber 12 via the vacuum inlet and outlet ports 24, 26. Circulating air surrounding lens 20 defining lens cleaning member 22 keeps lens 20 from accumulating particulates during laser marking. In this way, the focus of the laser beams is not distorted during operations.

The invention has been described with reference to a preferred embodiment. However, it will be appreciated that variations and modifications can be effected by a person of ordinary skill in the art without departing from the scope of the invention.

Parts List:

10 nozzle element
12 chamber
14 chamber laser energy inlet end
16 chamber laser energy outlet end
18 air jet member
20 lens
22 lens cleaning member
24 vacuum inlet port
26 vacuum outlet port
30 laser beam tube
32 lasers
34 laser marking system

What is claimed is:

1. A nozzle element for a laser beam tube, comprising:
    a chamber having a laser energy inlet end and a laser energy outlet end;
    an air jet member arranged in said chamber for directing a burst of air onto a laser beam impingeable surface;
    at least one lens arranged in said chamber for focusing each one of a plurality of laser beams passing through said chamber;
    a lens cleaning member arranged in said chamber proximate to said at least one lens; and
    a vacuum port extending from said chamber, said vacuum port providing means for evacuating said chamber of smoke and debris generated during laser marking.

2. The nozzle element recited in claim 1 wherein said at least one lens is adjustably mounted in said chamber for adjusting the focus of said each one of a plurality of laser beams.

3. The nozzle element recited in claim 1 wherein said laser energy outlet end of said chamber is configured for arrangement proximate to a moving photosensitive web.

4. The nozzle element recited in claim 1 wherein said lens cleaning member comprises a positive air flow pattern shielding said at least one lens from particulate matter.

5. The nozzle element recited in claim 1 wherein said laser energy outlet end is substantially conical shaped for concentrating vacuum on a predetermined location.

* * * * *